US006703089B2

United States Patent
DeProspero et al.

(10) Patent No.: US 6,703,089 B2
(45) Date of Patent: Mar. 9, 2004

(54) BLEED-RESISTANT DRY-TRANSFER WALLCOVERINGS

(75) Inventors: David A. DeProspero, Strongsville, OH (US); Theresa Lozinski, Cleveland, OH (US)

(73) Assignee: Imperial Home Decor Group Management, Inc., Cleveland, OH (US)

( * ) Notice: Subject to any disclaimer, the term of this patent is extended or adjusted under 35 U.S.C. 154(b) by 31 days.

(21) Appl. No.: 09/970,827

(22) Filed: Oct. 4, 2001

(65) Prior Publication Data

US 2002/0040648 A1 Apr. 11, 2002

Related U.S. Application Data

(60) Provisional application No. 60/238,825, filed on Oct. 6, 2000.

(51) Int. Cl.$^7$ .................................................. B41M 5/40
(52) U.S. Cl. ................................ 428/32.76; 428/32.79; 428/201
(58) Field of Search ................................ 8/471; 503/227; 428/195, 32.76, 32.79, 195.1, 201, 204

(56) References Cited

U.S. PATENT DOCUMENTS

| | | | |
|---|---|---|---|
| 1,475,922 A | 11/1923 | Soglow | |
| 1,648,020 A | 11/1927 | Labram | |
| 3,131,106 A | 4/1964 | Mackenzie | 156/230 |
| 3,298,850 A | 1/1967 | Reed et al. | 117/3.1 |
| 3,432,376 A | 3/1969 | Reed et al. | 156/234 |
| 3,629,034 A | 12/1971 | Kuroda | 156/219 |
| 3,635,746 A | 1/1972 | Karlan | 117/3.1 |
| 3,896,249 A | 7/1975 | Keeling et al. | 428/202 |
| 3,921,348 A | 11/1975 | Kurzen | 52/64 |
| 4,022,926 A | 5/1977 | Keough et al. | 428/41 |
| 4,028,165 A | 6/1977 | Rosenfeld | 156/234 |
| 4,056,648 A | 11/1977 | Richardson | 428/138 |
| 4,111,734 A | 9/1978 | Rosenfeld | 156/234 |
| 4,211,810 A | 7/1980 | Barta | 428/201 |
| 4,286,008 A | 8/1981 | Reed et al. | 428/195 |
| 4,308,310 A | 12/1981 | Arnold et al. | 428/195 |
| 4,326,005 A | 4/1982 | Reed et al. | 428/201 |
| 4,337,289 A | 6/1982 | Reed et al. | 428/195 |
| 4,421,808 A | 12/1983 | Winkowski | 428/55 |
| 4,421,816 A | 12/1983 | Arnold | 428/202 |
| 4,517,044 A | 5/1985 | Arnold | 156/277 |
| 4,536,423 A | 8/1985 | Travis | 428/14 |
| 4,640,727 A | 2/1987 | Janssen | 156/240 |
| 4,759,968 A | 7/1988 | Janssen | 428/202 |
| 4,804,572 A | 2/1989 | Bodrogi | 428/195 |
| 4,900,604 A | 2/1990 | Martinez et al. | 428/79 |
| 4,919,994 A | 4/1990 | Incremona et al. | 428/141 |
| 4,999,076 A | 3/1991 | Incremona et al. | 156/241 |
| 5,021,275 A | 6/1991 | Kim | 428/42 |
| 5,209,959 A | 5/1993 | McNaul et al. | 428/40 |
| 5,225,260 A | 7/1993 | McNaul et al. | 428/40 |
| 5,464,681 A | * 11/1995 | Luce | 428/195 |

(List continued on next page.)

FOREIGN PATENT DOCUMENTS

GB          1580076          11/1980

*Primary Examiner*—B. Hamilton Hess
(74) *Attorney, Agent, or Firm*—Pearne & Gordon LLP

(57) ABSTRACT

A dry-transfer appliqué is provided for wall decoration. The appliqué has at least three bleed-resistant color pigments, including a bleed-resistant magenta pigment, that will not bleed or show through a coat of paint once the appliqué is painted over for redecorating. The appliqué has an as-applied thickness of 1.3–8 mils so that it will not be visible through a coat of paint. A plurality of dry-transfer appliqués are also provided having designs corresponding to a common design theme. The appliqués can be placed by the consumer to provide a custom design suited to that consumer's personal taste.

36 Claims, 2 Drawing Sheets

U.S. PATENT DOCUMENTS

| | | | |
|---|---|---|---|
| 5,487,929 A | 1/1996 | Rusincovitch, Jr. et al. | 428/40 |
| 5,491,006 A | 2/1996 | Johnson et al. | 428/13 |
| 5,513,567 A | 5/1996 | Froh et al. | 101/170 |
| 5,573,865 A * | 11/1996 | Steelman et al. | 428/40.9 |
| 5,639,539 A | 6/1997 | DeProspero et al. | 428/195 |
| 5,683,774 A | 11/1997 | Faykish et al. | 428/40.1 |
| 5,691,020 A | 11/1997 | Kondoh et al. | 428/40.1 |
| 5,700,564 A | 12/1997 | Freedman | 428/332 |
| 5,705,257 A | 1/1998 | Froh et al. | 428/195 |
| 5,741,387 A | 4/1998 | Coleman | 156/240 |
| 5,817,402 A | 10/1998 | Miyake et al. | 428/159 |
| 5,851,614 A | 12/1998 | Buck | 428/40.1 |
| 5,866,220 A | 2/1999 | Rusincovitch et al. | 428/40.1 |
| 5,898,018 A | 4/1999 | Hirano et al. | 503/227 |
| 5,942,065 A * | 8/1999 | Biggs et al. | 156/90 |
| 5,962,110 A | 10/1999 | Penke-Wevelhoff | 428/195 |
| 6,033,737 A | 3/2000 | Johnson et al. | 427/385.5 |
| 6,042,914 A | 3/2000 | Lubar | 428/41.4 |
| 6,110,317 A | 8/2000 | Sandor | 156/235 |
| 6,119,385 A | 9/2000 | Olivier | 40/661.12 |
| 6,228,194 B1 | 5/2001 | Cowen | 156/63 |
| 6,507,413 B1 * | 1/2003 | Mueller et al. | 358/1.9 |

* cited by examiner

BLEED-RESISTANT DRY-TRANSFER WALLCOVERINGS

This application claims the benefit of U.S. Provisional Patent Application Serial No. 60/238,825 filed Oct. 6, 2000.

BACKGROUND OF THE INVENTION

1. Field of the Invention

The invention relates to bleed-resistant dry-transfer wallcoverings. More particularly, it relates to a plurality of such wallcoverings designed together to provide the user the ability to decorate with high quality and easily varied designs having a common theme.

2. Description of Related Art

It is often desirable to provide a high quality hand-painted design on the wall of a room or related interior surface. For example, people often hire artists to paint a design or mural onto the walls of a child's room or infant's nursery. Unfortunately, not everybody can afford the expense of hiring an artist. Often times, sophisticated decorating with paint is labor intensive, requiring time and artistic skill that is beyond the average consumer. Hence, many people have turned to appliqués for providing themed decorative scenes on their walls.

Appliqués have enjoyed moderate success. Traditionally, appliqués have been available to provide a border around the perimeter of a room, for example near the ceiling or above the wainscot. There are at least two principal drawbacks to current appliqués. The first is that they do not provide the same high quality hand-painted appearance as a painted design. Second, existing appliqués result in a thick decorated layer that must be removed prior to redecorating and cannot easily be painted over without leaving the outline of the past art.

Traditionally, appliqués are cut into 4–6 color sheets, making design limited. Frequently one color is applied wet and must be allowed to dry before the next color is applied, making appliqué application very cumbersome and time consuming. Color application for existing appliqués is thick and typically limited to displaying only coarse elements.

Some transfer appliqués are made via a screen printing process. Screen printed appliqués allow a limited number of colors for the design (i.e. up to 4–6 colors). They also have limited resolution which limits the intricacy of the design, and do not control color transparency, but result in a thick opaque color deposit that is within the application skill level of most do-it-yourself consumers.

Higher quality appliqués are also available which are made via an offset printing process. However, these appliqués must be removed from a wall prior to redecorating because they cannot be painted over. Existing appliqués cannot be painted over because the ink typically used in them, particularly the red ink, Red 2B, bleeds through the paint within a day to several weeks of being painted over and stains the wall, in addition, these appliqués often have a thick vinyl, paper or other polymer support layer which would appear unsightly through a coat of paint. The necessary removal of a permanently adhered appliqué is a difficult and cumbersome task.

There is a need in the art for a high quality appliqué providing the appearance (detail and resolution) of a hand-painted design that can simply be painted over when it is time to redecorate. Preferably, such an appliqué will be of the dry-transfer kind, and not a wet-transfer appliqué which is used in the art but frequently stains the wall with water or glue marks. Preferably, the dry-transfer appliqué will use inks that will not bleed through a coat of paint when redecorating. Also, such an appliqué preferably will be very thin or have negligible thickness such that it will not be visible to an observer through a coat of paint. In addition, there is a need to expand the appeal of dry-transfer wallcoverings beyond the traditional border concept such that appliqué are used for overall themed decoration of a room or living space. Preferably, such an improved dry-transfer appliqué will allow a typical do-it-yourself consumer to arrange and coordinate elements into more intricate and appealing designs to suit his or her particular application.

SUMMARY OF THE INVENTION

A dry-transfer appliqué is provided having an ink design layer and a pressure sensitive adhesive layer. The ink design layer has at least three color ink layers. Each of the color ink layers has a color pigment that is bleed-resistant.

An appliqué assemblage is also provided having a plurality of dry-transfer appliqués. Each of the appliqués has a unique appliqué design that is consistent with a particular decorative theme. Each of the appliqués has an ink design layer and a pressure sensitive adhesive layer. The ink design layer has at least three color ink layers. Each of the color ink layers has a color pigment that is bleed-resistant.

DETAILED DESCRIPTION OF THE PREFERRED EMBODIMENTS OF THE INVENTION

Figure 1:
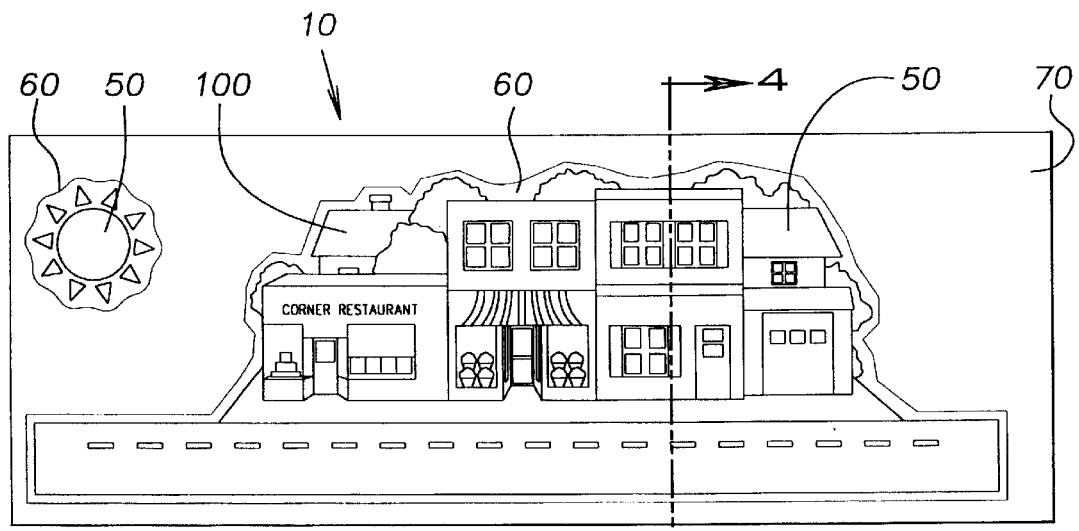
FIG. 1 is a top view of an appliqué according to the invention, depicting a roadside town according to an exemplary roadside town theme.

As used herein, a light-fast ink or pigment is one that experiences no or substantially no increase in stiffness, tackiness, crazing, color change, or other visual deviation following prolonged xenon arc exposure according to test method ASTM G 26–90 Method C for at least 23 hours. Preferably, the time period is 46, preferably 200, hours.

Also as used herein, a non-staining ink, pigment or adhesive is one that is stable or substantially stable or resistant against chemical attack from conventional household cleaners containing, e.g. ammonia, chlorinated or oxygenated cleaners and/or surfactants.

Also as used herein, a bleed-resistant pigment is one that will not bleed or show through two coats of standard latex paint and will not stain a wall or surface having a dry-transfer appliqué thereon that has been painted over, for at least 1 year. Preferably, a bleed-resistant pigment will not bleed or show through one coat of standard latex paint or stain a wall or surface having a dry-transfer appliqué thereon that has been painted over, for at least 2, preferably 3, preferably 5, preferably 10, years.

Also as used herein, an ink or pigment is substantially water insoluble if, during an offset printing process, the color transfer of the ink or pigment into adjacent hydrophilic non-printing areas as known in the offset printing art is at least 20 ΔE CMC (1,3) units relative to the printing area, where both the non-printing and printing areas are applied over a standard white background sheet. It is not necessary that the ink or pigment be printed directly onto the white background sheet; i.e. the ink or pigment can be printed onto a transparent or clear structural layer that itself is disposed on or over or adjacent to the white background sheet. Preferably, the color transfer of the ink or pigment to adjacent hydrophilic non-printing areas does not exceed 50, preferably 100, preferably 118.6, preferably 150, ΔE CMC (1,3) units relative to the printing area as above described.

Figure 4:
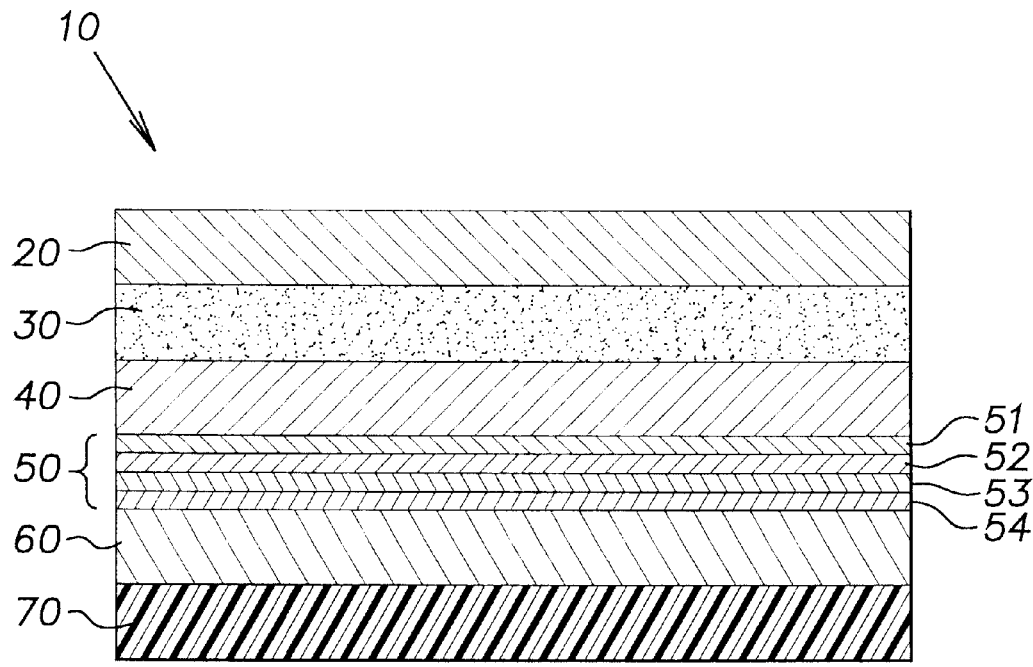
FIG. 4 is a cross-sectional view taken along line 4—4 of the appliqué in FIG. 1 as-supplied prior to affixing to a wall.

Referring first to FIG. 4, a cross-sectional view of a preferred embodiment of an invented appliqué 10 is shown. The appliqué in FIG. 4 is shown as-supplied; i.e. prior to being applied or adhered to a wall. As seen in FIG. 4, an invented appliqué 10 preferably is provided having a parchment or other adhesive release liner 20, a pressure sensitive adhesive (PSA) layer 30, a backing layer 40, an ink design layer 50, a structural layer 60, and a carrier sheet 10. An alternative configuration is to have the release properties of structural layer 60 incorporated into the first applied color ink layer 54 as will be explained below. In this embodiment, structural layer 60 is preferably a clear or transparent layer and is disposed between ink design layer 50 (or the last applied color ink layer 51) and the backing layer 40.

Preferably, carrier sheet 70 is a translucent carrier sheet so that the underlying design and the surface to which it is applied are visible therethrough. A preferred translucent carrier sheet 70 is a polystyrene sheet having a thickness of 1–8, preferably 2–6, preferably 3–5, preferably about 4.5, mils. Less preferably the carrier sheet 70 can be oriented polypropylene or rigid PVC, less preferably any other polymeric or suitable material such as paper, parchment or siliconized coated paper. It is important that the carrier sheet 70 is made from a substantially non-stretchable material in order a) to facilitate proper registration of the structural, ink design, and PSA layers (60, 50, and 30) during manufacturing, and b) to prevent the underlying structural and ink design layers (60 and 50) from fracturing due to stress from handling of the appliqué prior to application.

Preferably, the carrier sheet 70 is full width; i.e. the carrier sheet 70 extends beyond all underlying layers, preferably having a rectangular shape with dimensions (length and width) extending beyond the ink design layer 50 at all points around the perimeter thereof, preferably at least 0.2, 0.3, 0.4, 0.5, 0.8, or 1, inch. Optionally, an invented dry-transfer appliqué 10 can have a plurality of discrete design elements having separate and discrete design layers 50 forming a complete appliqué design 100 on the same carrier sheet 70 (e.g. the sun and roadside town as shown in FIG. 1). In this embodiment the discrete design elements are oriented in a specific pattern on the carrier sheet relative to one another, and carrier sheet 70 has sufficient dimensions to contain all such design elements For example, as shown in FIG. 1, carrier sheet 70 extends beyond the entire appliqué design 100 (the sun and roadside town in FIG. 1). For an appliqué having only one design element (such as the town alone in FIG. 1), sheet 70 need only have sufficient dimension to contain that element. In FIG. 1, sheet 70 is shown as a rectangular sheet which completely encloses the separate roadside town and sun images, the town and the sun together forming the overall appliqué design 100. The carrier sheet is preferably rectangular to aid orthogonal orientation of the appliqué design 100 on a wall. Each appliqué 10 preferably has dimensions that are small enough to permit a consumer to conveniently handle the appliqué and avoid inadvertent transfer of the design 100 during application. Preferably, each appliqué 10 has no dimension (length or width) greater than 4, preferably 3, preferably 2, feet. As will be further described below, all subsequent layers of the appliqué 10, except the adhesive release liner 20, preferably have substantially the same shape as the appliqué design 100 and are substantially coextensive or in register with (i.e. having slightly larger or smaller dimensions than) the ink design layer 50 which provides the appliqué design 100.

Figure 5:
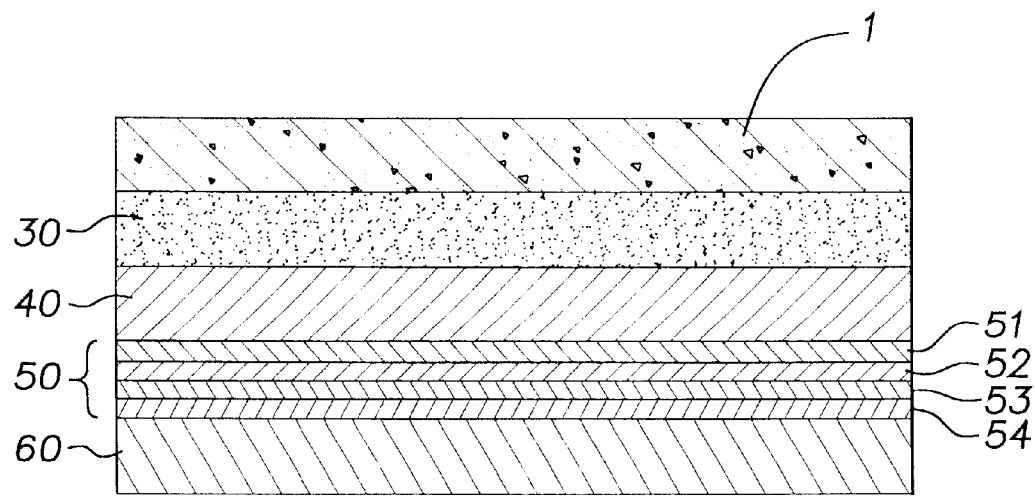
FIG. 5 is a cross-sectional view similar to FIG. 4 except that the appliqué is shown affixed or as-applied to a wall.

In a first preferred embodiment, a structural layer 60 is disposed adjacent the carrier sheet 70 in front of the ink design layer 50 as shown in FIGS. 4 and 5. In this first preferred embodiment, the ink design layer 50 (described below) is printed or disposed onto or adjacent the structural layer 60 opposite the carrier sheet 70. Alternatively, in a second preferred embodiment, the structural layer 60 is disposed behind the ink design layer 50, between the ink design layer and the PSA layer 30, with the ink design layer 50 being printed or disposed onto or adjacent the carrier sheet 70. In this second preferred embodiment, the ink design layer 50 must have release properties relative to the carrier sheet as explained below to allow separation of the design layer 50 from the carrier sheet 70 following transfer.

Preferably, structural layer 60 is a clear or transparent layer. Preferably, structural layer 60 is a screen printed layer in the shape of the appliqué design 100. Preferably, structural layer 60 is thicker than any of the color ink layers 51–54 described below to provide structural support to the as-applied appliqué 10. Preferably structural layer 60 is 0.3–8, more preferably 0.3–7, more preferably 0.3–5, more preferably 0.3–3, more preferably 0.3–2, more preferably 0.3–1.5, mils thick. It is preferably a clear, matte surface layer that is configurable or compliant to the texture of the carrier sheet 70, abrasion resistant, light-last, water-fast, releasable from the carrier sheet 70 with applied pressure, stain resistant, and able to accept an even coat of water based or latex paint should the consumer wish to redecorate over the appliqué 10. Typically, the structural layer 60 is applied as a solvent-based, emulsion coating, or UV-cured composition, by any suitable coating method such as by litho, offset gravure, rotary screen, automatic flat bed screen, or other method that gives a continuous coat in the shape of the overall design of the ink design layer 50 and registered to the ink design layer in the converting machine by indexing to the carrier sheet 70 or appropriate marks.

The structural layer 60 can be made from a volatile solvent-based composition comprised of one or more polymers derived from vinyl monomers such as vinyl chloride or vinyl esters. Examples of vinyl esters include vinyl acetate, vinyl propionate, vinyl butyrate, vinyl pivilate, vinyl laurate and vinyl versatate, with vinyl acetate being preferred. The vinyl monomers may be copolymerized with other monomers such as unsaturated carboxylic acid esters, including acrylic acid and methacrylic acid, and/or alpha-olefin monomers, including ethylene and propylene. The structural layer polymers can have a molecular weight range from 15,000 to 500,000 and glass transition temperatures ($T_g$) ranging from 20° C. to 105° C. The polymer or polymer mixture can be dissolved in one or more volatile organic solvents such as toluene, methylethyl ketone, methyl isobutyl ketone, ethanol and mixtures thereof. When coated onto the carrier sheet 70 and dried, the polymer forms a smooth transparent flexible film for structural layer 60. The structural layer composition can be extended with a clear film forming binder and modified in its properties by incorporating a siliconized oil or polymer.

The structural layer 60 can also be made from a solvent-based perfluoroalkyl copolymer that is stain and soil repellant such as solvent-based Teflon from DuPont. Compositions of this type are described in U.S. Pat. No. 4,804,572 to Bodrogi. Commercially available solvent-soluble polymers and copolymers of perfluoroalkyl acrylates or methacrylates may be used. Examples of polymerizable perfluoroalkyl acrylate or methacrylate monomers include those having the formula: $R_fROCOCR'=CH_2$ wherein $R_f$ represents a straight or branched perfluoroalkyl group containing 3 to 15 carbon atoms; R is an alkylene group containing 1 to 10 carbon atoms; and R' is hydrogen or a methyl group.

Additionally, the structural layer 60 may be made from a water based emulsion. These may include Teflon. In general, such emulsions are preferably applied such that the structural layer 60 has a thickness of 0.2–8, preferably 0.4–2, preferably 0.5–1.5, mils. Emulsions of this type may contain fluorocarbon polymers, more specifically, fluoroalkyl polymers. A commercially suitable fluoroalkyl polymer emulsion is FX845 sold by 3M. With respect to the application of a structural layer 60 containing fluorocarbon polymeric material, the coating should be heated to a temperature of at least 80° C. to promote curing of the material and, more preferably, to a temperature of 90° to 110° C.

Alternatively, the structural layer 60 may include emulsions of silicone-based compounds in water, including, for example, emulsions in which the silicone is crosslinked. Numerous silicon-based compounds may be employed over a wide range of molecular weights such as those containing polysiloxanes including, for example, polydimethyl siloxane and dimethyl hydrogen polysiloxane. A suitable commercial silicone emulsion is GE Silicone 1142-148/SM3010 sold by GE Silicones, Inc. The 1142-148/SM3010 emulsion polymer is 32–38% active, is cationically stabilized using polyethylene glycol (methyl-octadecylamino) diethylether chloride, and is supplied at a pH of 4.5–6.5. Upon application of a structural layer 60 employing a silicone emulsion, it is preferred that the structural layer be heated to a temperature of at least 145° C. to properly cure the silicone material.

In yet another embodiment, the composition of the structural layer 60 may include an ultraviolet curable polymer such as a methacrylate polymer including varying concentrations of silicone (e.g., about 2–8% by weight). A particularly suitable methacrylate polymer is Rad-Kote 862 with Rad-Cure SRC-46 silicone additive. The UV-curable coating can be made dull to a Gardner range of 12–15 at 30° C. via the addition of silica and/or maintaining an application thickness of less than about 0.5 mils. Cure can be accomplished using standard or electrodeless lamps with an output of about 300 watts/inch, the operation of which is within the skill of one in the art.

Another suitable structural layer composition is low softening point polyamide such as Union Camp Micromid 321 RC. In addition, the structural layer 60 can also include other additives and agents, including anti-blocking agents such as microcrystalline waxes and polyethylene waxes. Wetting agents can also be used to improve the wetting and coating of the structural layer 60, especially with respect to silicone emulsions. A commercially acceptable wetting agent is Troysol LAC made available from Troy Chemical. In a preferred embodiment, GE 1142-148/SM3010 may be diluted to 12 weight percent solids, combined with Troysol LAC, and applied to the carrier sheet using an offset litho press using a waterless plate system. The structural layer should be dried tac free at 105° C. Complete cure may be obtained by subjecting the applied coating to a temperature in excess of 145° C. Preferably, structural layer 60 has substantially the same shape as the appliqué design 100 (and thereby ink design layer 50) but has slightly larger dimensions such that it extends slightly beyond the appliqué design. (See FIG. 1). This is to ensure that the entire design is printed on (within the boundary of) the structural layer 60 despite minor variances or errors in registration that may occur during production. Preferably, structural layer 60 extends 0.05–5, preferably 0.1–4, preferably 0.3–3, preferably 1–2, mm beyond the ink design layer 50 around the perimeter thereof.

The color system of the appliqué 10 is provided in the ink design layer 50, and is determined by the color gamut and physical ink properties (such as thickness limitations) required by the art for a particular design 100. Suitable color systems can be achieved via 6-color hexachrome inks, process plus light cyan and light magenta inks, and 4-color process plus 4 spot color inks. Most preferably, the color system is provided with 4-color process inks, where the individual inks are tailored to meet the physical and color gamut properties detailed below. Most preferably, the 4-color process inks are yellow, magenta, cyan, and black as will be further described.

Preferably, design layer 50 is a four-layer printed design layer having four separate color ink layers 51, 52, 53, and 54. (See FIG. 5). Color ink layers 51, 52, 53, and 54 are each as thin as possible while still achieving the necessary color density for the design 100, preferably 0.2–7, more preferably 0.2–1.5, mils thick. Preferably, layers 54, 53, 52, and 51 are yellow (Y) magenta (M), cyan (C), and black (K) respectively (collectively YMCK), and are preferably laid down in that order. Depending on the prepress color separation method, other order of print such as cyan (C), magenta (M), yellow (Y), and black (K) (collectively CMYK), can be used as long as the first ink applied exhibits the necessary release properties and all the colors exhibit the physical properties as previously described. In the case when the design layer 50, (and first color ink layer 54) is directly applied to the carrier sheet 70, the color ink layers 51–54 preferably exhibit the same or similar physical and chemical properties as previously described for structural layer 60. This is to ensure proper release of the ink design layer 50 (and color ink layers 51–54) from the carrier sheet 70 following transfer to a wall or surface.

As stated above, structural layer 60 is disposed between carrier sheet 70 and ink design layer 50 in the first preferred embodiment. In this embodiment, referring to FIG. 4, layer 54 is laid down first on structural layer 60 and is a preferably yellow layer. Preferably, Layer 53 is a magenta layer and is laid down next over yellow layer 54, with cyan layer 52 laid over magenta layer 53, and black layer 51 laid over cyan layer 52. In the second preferred embodiment, ink layers 51–54 are similarly laid down on or adjacent the carrier sheet 70, with structural layer 60 next disposed over the color ink layers. The ink layers may be applied by gravure, lithe, flexo, direct digital, or offset press. Preferably, these four layers are applied via conventional high quality offset printing process (preferably UV-curable offset lithography) to produce the desired appliqué design 100 for a particular appliqué 10. Less preferably, the ink design layer 50 can be a three-layer printed design layer having three separate color ink layers, for example by eliminating the black ink layer, leaving the yellow, magenta and cyan ink layers described above.

It will be understood that color ink layers 51–54 need not (and most likely will not) be continuous layers. Rather, they will vary in intensity and color density to achieve a desired design 100. At some points of the design 100, for example where only a blue color is required, there may be no yellow, magenta or black ink, and the only color ink layer present may be the cyan layer 52. In addition, at other points along the design, only two or three color ink layers may be required to produce the desired color effect. It will also he understood that the order of ink laydown can be changed or spot color used instead of process color to obtain a desired design. Less preferably, layers 51, 52, 53, and 54 can be applied via waterless offset printing, direct lithographic printing, intaglic printing, gravure printing, screen printing, ink jet or electrographic direct digital printing, electrocoagulation printing or Electrography as known in the art, less preferably via another conventional printing method. High quality offset four-color printing is preferred for design layer 50 (and the individual ink layers which make up design layer 50) because of the color deposit ranges available and high quality hand-painted appearance of appliqués produced thereby when adhered to a wall. Less preferably, design layer 50 can be other than three or four color ink layers (e.g. 2, 5, 6, 7, 8, or any other number of color or gray-scale layers). Less preferably, design layer 50 can be a single layer of ink applied via a conventional process to produce a monochromatic design.

Preferably, the ink design layer 50 (including color ink layers 51–54) is printed onto structural layer 60 in the negative image for the design 100 so that the positive image of appliqué design 100 appears correctly when viewed from the front of the appliqué; i.e. through the structural layer 60.

Most preferably, when design layer 50 is printed via offset four-color printing, the yellow, cyan and black inks are conventional litho inks known in the art. It has been found that conventional yellow, cyan and black inks do not bleed through or stain a wall once painted over for redecorating. Such commercial inks comprise a color pigment, binder resin or resinous vehicle, and solvent that may be a polymerizable monomer or a partially fugative high-boiling aliphatic petroleum fraction. When the latter solvent is used, the resulting solvent in the inks are referred to as ink oils. Conventional inks can also contain additives such as photoinitiators, waxes, metal salt driers, anti-oxidants, antiskinning agents, strong solvents, gelling or bodying agents, and non-offsetting and rub-resistant agents. Suitable resins include acrylics, styrene-acrylics, alkyds, hydrocarbons polymers, and other conventional binders. Commercial inks and ink oils may also include siliconized oils, UV or electron beam cure initiators, or other ingredients known in the art or trade to promote desired visual effects. The pigments are preferably light-fast, non-staining, bleed-resistant, and substantially water insoluble.

The magenta ink is similarly comprised as the yellow, cyan and black inks described above, with the magenta color pigment used therein being specially selected to be bleed-resistant and non-staining. This is because conventional magenta pigments, e.g. Red 2B, will bleed through a coat of standard latex or water-based paint upon redecorating, and often will stain the surface red or pink. The magenta pigment preferably is substantially water insoluble. The magenta pigment also preferably has the following C.I.E. Lab chromaticity coordinates:

L: 40–80, preferably 50–70, preferably 55–65, preferably 60–64, preferably 61–63, preferably 61.5–62.5, preferably about 62.01;

a: 50–90, preferably 60–85, preferably 65–80, preferably 70–79, preferably 73–78, preferably 75–76, preferably about 75.41; and b: ⁻14–50, preferably ⁻10–40, preferably ⁻5–30, preferably ⁻1–20, preferably 0–15, preferably 2–10, preferably 4–9, preferably 6–8, preferably about 7.4.

Most preferably, the magenta pigment is a quinacridone red pigment, preferably C.I.E. 122, less preferably C.I.E. 122:1, C.I.E. 122:2, or C.I.E. 122:3, less preferably another quinacridone red pigment, less preferably a mixture thereof. It has been found that quinacridone red pigments are effective magenta pigments that will not bleed through an overcoat of paint. Unlike conventional magenta pigments, such as Red 2B, quinacridone red pigments are bleed-resistant or substantially bleed-resistant.

Less preferably, the magenta pigment used in the magenta ink is a rhodamine pigment or an anthropyridone pigment that is selected to be bleed-resistant. It will be understood that quinacridone red, rhodamine, anthropyridone, and other bleed-resistant magenta pigments will have slightly different coloring characteristics than conventional magenta pigments such as Red 2B. A person of ordinary skill in the art will be able to adjust the yellow, cyan and black inks (in terms of color and/or chromaticity coordinates) to compensate for the bleed-resistant magenta pigment in creating a particular color design.

In the first preferred embodiment described above, the backing layer 40 is applied over the design layer 50 opposite the structural layer 60 (as shown in FIGS. 4 and 6). In the second preferred embodiment described above, the backing layer 40 is applied over the structural layer 60, which itself has been applied over the ink design layer 50 opposite the carder sheet 70. The backing layer 40 is preferably 0.2–7, more preferably 0.2–5, more preferably 0.2–1.5, mils thick. Preferably, the backing layer 40 is an opaque white layer, less preferably a black layer, less preferably any other color, Most preferably, the backing layer 40 is a two-phase layer having a binder phase and a pigment phase. The binder phase is preferably a continuous polymeric phase, preferably cross-linked, with the pigment phase dispersed throughout the binder phase. Preferably, the binder phase is a vinyl acetate or acrylic binder, or another binder having a high pigment-to-binder ratio. Less preferably, the binder can be methacrylate, butyrate, or other binder. These binders are less preferred because they have lower pigment-to-binder ratios, and the backing layer 40 will have to be thicker to hold sufficient pigment to ensure the opacity of the backing layer 40. Preferably, backing layer 40 is an opaque white backing layer 40 having a white pigment, i.e. titanium dioxide. Optionally, backing layer 40 can have a design printed or inked thereupon which design will beneficially show through appliqué design 100. The purpose of the backing layer 40 is to prevent the color (or texture or design) of the wall or surface upon which appliqué 10 is applied from being visible or from otherwise negatively altering the color or appearance of the appliqué design 100. Optionally, backing layer 40 can be omitted if it is desired to have a "transparent" look such that the wall or surface shows through the appliqué design 100. When the backing layer 40 is omitted, structural layer 60 provides the principal structural support for the appliqué 10.

Preferably, the backing layer 40 has substantially the same shape as the appliqué design 100 (and ink design layer 50) but has slightly smaller dimensions such that design layer 50 (and therefore design 100) extends slightly beyond the backing layer 40 around the perimeter thereof. Preferably, ink design layer 50 extends 0.05–5, preferably 0.5–4, preferably 0.8–3, preferably 1–2, mm beyond backing layer 40 around the perimeter thereof. This is to ensure that the appliqué 10 does not appear to have a printed border or "halo" around the design 100 from the backing layer 40. The backing layer can be applied via screen printing over the ink design layer 50 (or structural layer 60). Less preferably, backing layer 40 can be applied via other known or conventional means.

The PSA layer 30 is preferably applied to the underside of backing layer 40 (i.e. opposite design layer 50), preferably via screen-printing. The PSA layer 30 is preferably 0.2–7, preferably 0.2–5, preferably 0.2–1.5, mils thick, and is preferably an acrylic adhesive, preferably having a surface tension of 30–40, preferably 34–37, dynes/cm, and preferably being 40–60, preferably 47–53, weight percent solids before cure. A preferred acrylic adhesive is a styrene-acrylic polymer adhesive such as Johnbond SCX 722. Less preferably, PSA layer 30 can be another known adhesive that is light-fast, water-fast and non-staining, less preferably, a styrene-butadiene adhesive, less preferably a natural rubber adhesive. These adhesives are less preferred in part due to their tendency to yellow. Preferably, PSA layer 30 has substantially the same shape as, and extends slightly beyond, ink design layer 50, preferably 0.05–5, preferably 0.5–4, preferably 0.8–3, preferably about 1–2, mm. In the first preferred embodiment described above, the PSA layer 30 is preferably substantially coextensive with structural layer 60, with the design and backing layers 50 and 40 sandwiched therebetween. Preferably, the PSA layer 30 is not coextensive with carrier sheet 70. In both the first and second preferred embodiments, the PSA layer 30 preferably does not extend beyond the structural layer 60 so that the PSA layer does not contact the carrier sheet 70. Otherwise, the carrier sheet 70 could resist peeling off due to adherence to the PSA layer. In that event, the PSA layer could fracture, or the design layer 50 may be peeled off or torn upon peeling off the carrier sheet 70.

The PSA is selected such that it has an initial tack so the appliqué 10 can be temporarily adhered to a wall or surface to judge positioning before being rubbed or pressed hard to be bonded permanently to the wall. Preferably, the initial tack of the PSA layer 30 is 5–15 oz/in, meaning that it will require 5–15 oz of force per linear inch of the PSA layer to remove the appliqué from a substrate (wall) surface after having been contacted therewith for 30 minutes. Preferably, the permanent tack of the PSA layer 30 is at least 25, preferably 35, preferably 45, preferably 50, oz/in after being permanently pressed into place by an applicator as described below onto a substrate or wall surface. Such a PSA layer is optimized for a textured or painted wall or ceiling. It will be understood that a PSA layer could also be designed to have lower initial tack so that it could be temporarily adhered to other types of surfaces having higher surface energies, e.g. glass, metal, varnished wood, etc. Other suitable repositionable PSA's are known in the art.

An adhesive release liner 20 of conventional materials is releasably adhered to PSA layer 30 to prevent the appliqué from sticking to itself or to other objects prior to application to a wall or surface. This adhesive release liner 20 is preferably coextensive with carrier sheet 70, though it is only necessary that adhesive release liner 20 be coextensive with PSA layer 30 to prevent inadvertent adherence of the appliqué 10 to other objects or to itself.

An invented appliqué 10 as-applied to a wall or surface is preferably composed of a structural layer 60, an ink design layer 50 (including color ink layers 51–54), an opaque backing layer 40, and a PSA layer 30 as above described. This is shown for the first preferred embodiment in FIG. 5. The appliqué 10 preferably has an as-applied thickness of 1.3–8, preferably 1.5–7, preferably 1.5–6, preferably 1.5–5, preferably 1.5–4, preferably 1.5–3, mils. Such a thin as-applied dry-transfer stencil appliqué can be readily painted over and will not be visible through two coats, preferably one coat, of paint, yet will still provide a high quality hand-painted appearance suitable for displaying intricate designs.

FIG. 4 illustrates (cross-sectionally) an invented appliqué 10 as-supplied. The customer can see the design 100 through the translucent polystyrene sheet (and clear structural layer) and make his or her purchase decision based thereon. FIG. 5 shows a cross-section of the appliqué as applied to a wall or surface substrate 1. It can cover parts of a wall, or be a border, such as at the top of the wall. It can be placed as a border around a window or a doorway or above a mantle. It is preferably a decorative residential or office wallcovering product. One way of describing it is to say that it is self-adhesive wallpaper without the paper. It is designed to give the look of the highest quality hand-painted decoration without the mess, work or skill necessary for hand painting. To install the appliqué on a wall, such as in a home or office, the adhesive release liner 20 is removed, exposing the PSA layer 30. The appliqué is then positioned on a wall or surface with gentle pressure (i.e. by lightly pressing with one's fingers), and judged for position and orientation. If the appliqué needs to be moved, it is simply peeled off, repositioned in a similar manner, and rejudged. Once the appliqué is properly positioned, it is permanently adhered to the wall by applying firm pressure evenly across its surface, preferably with an applicator having a 0.05–5, preferably 0.1–2, preferably 0.2–1.0, mm diameter edge. Then the polystyrene sheet 70 is peeled off, leaving only the appliqué design 100 visible on the wall. If a portion of the design 100 did not transfer, the polystyrene sheet 70 can be replaced on the wall, and greater pressure applied over the untransferred portion to transfer it to the wall.

The carrier sheet 70 can be designed in one of two ways to provide either a glossy appliqué design or a matte or un-glossy appliqué design once applied to a wall. To provide a matte design, carrier sheet 70 is chosen as a matte or textured polystyrene sheet such that when structural layer 60 is removed from the polystyrene sheet it has a mirror image of the matte texture that has been imprinted or impressed therein, thus providing a matte appearance. Alternatively, the carrier sheet 70 can be chosen to provide a glossy texture which, when mirrored on the structural layer 60 upon removal of the carrier sheet 70, provides a glossy appearance over the ink design layer 50 on a wall or surface. These options are a matter of design choice, and appliqués 10 can be provided to accommodate both; one being a glossy appliqué and the other a matte or non-glossy appliqué, within the limits that removal of the carrier sheet 70 may become difficult if the matte texture is too extreme and interlocks the carrier layer 70 to the structural layer 60.

One benefit of the invented appliqué is that it is easy to apply, and there is no buildup of heavy paper or vinyl on the wall. As evident from FIG. 5, the invented appliqué as-applied to a wall preferably consists essentially of a PSA layer, an opaque backing layer, an ink design layer, and a clear structural layer. Further, as described above, both the backing and structural layers are optional layers and can be omitted to achieve desired effects leaving only the PSA and ink design layers 30 and 50 having a total as-applied thickness of about 1.3–8 mils. Preferably, an invented appliqué 10 includes at least one of these layers to provide strength and structural integrity to the appliqué as-applied. Such an appliqués which completely omits the heavy paper or vinyl substrate typical of existing appliqués, enables a consumer simply to paint over the appliqué when he or she wishes to redecorate. Removal of the appliqué is not required, as the appliqué is thin enough to be invisible or substantially invisible through preferably one, less preferably two, less preferably three, coats of paint. The inks used in the invented appliqué are selected to be bleed-resistant as described above, such that they will not show through two coats, preferably one coat, of paint.

Figure 2:
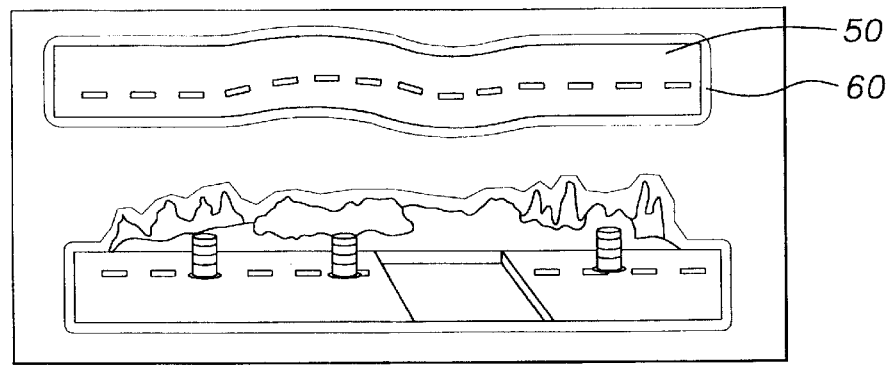
FIG. 2 is a top view of two appliqués according to the invention, depicting a road and a construction zone according to the exemplary roadside town theme of FIG. 1.
Figure 3:
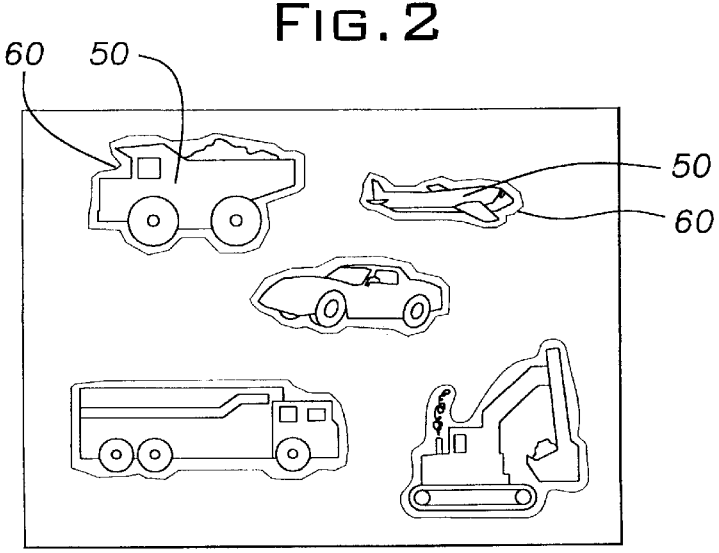
FIG. 3 is a top view of a plurality of appliqués according to the invention, depicting a variety of vehicles also according to the exemplary roadside town theme of FIG. 1.

Referring to FIGS. 1–3, a plurality of appliqués having a common theme according to the invention are provided. The appliqué can be provided separately or in a kit. Preferably, a plurality of these appliqués are applied to a wall or surface and cooperate to provide an overall wall decoration consistent with the theme. It is important to note that one appliqué can be applied over another to provide an overlapping effect. For example, the car appliqué in FIG. 3 can be applied over the road of the roadside town stencil in FIG. 1 to give the appearance of a car driving through the town. To achieve this result, preferably the roadside town appliqué (i.e. the appliqué containing the underlying image or design) is applied to the wall or surface first and permanently adhered thereto. Then, the second appliqué is applied over the first as desired, and permanently adhered thereto. Other variations are possible, and are intended.

In the most preferred embodiment, an invented appliqué is supplied having a 4.5 mils thick bi-axially oriented matte-flex polystyrene carrier sheet, the reverse print order four-layer YMCK design layer 50 with the magenta ink comprising quinacridone red C.I.E. 122 as the magenta pigment, the four color ink layers printed by offset printing onto the carrier sheet 10 (each ink layer being 0.2–5 mils thick) with the first ink layer 54 having release properties from the carrier sheet only when it is stressed or flexed, a 0.2–5 mils thick screen printed clear structural layer that forms the top surface of the appliqué 10 as-applied and is in the shape of the appliqué design 100 with a slightly larger size to allow registration, a 0.2–5 mils thick screen printed opaque white backing layer 40 on the back side of the structural layer 60 to prevent the color of the wall or surface upon which the appliqué is installed from significantly altering the appearance of the appliqué design 100, a 0.2–7 mils thick screen printed tacky PSA layer 30 having a low initial tack to allow temporary attachment and repositioning of the appliqué 10 and a permanent tack when applied under pressure from a hard wallcovering seam roller or other applicator having a 0.05–5, preferably 0.1–2, preferably 0.2–1, mm diameter edge, and a 2–10 mils thick parchment adhesive release liner 20 to prevent the PSA layer from prematurely adhering to the packaging or other surface.

The invented appliqué 10 has at least the following further advantages over existing wallcoverings. Wallpaper gives the end consumer a predefined look that may be customized only to a limited extent, e.g. by using a different pattern on one wall or above the wainscot (chair rail). Existing appliqués are largely limited to borders that are applied to a wall near the ceiling of a room. While an invented appliqué could be provided with a border pattern, it is also intended that a plurality of appliqués can be provided such that an entire wall or room can be decorated by the end consumer. In addition, the dry-transfer method of application (i.e. no water or solvent) eliminates the mess commonly associated with applying existing appliqués. In addition, the photo-like offset print quality and detailed cut-out look achieved by eliminating the traditional substrate provide a much greater artistic rendition than traditional or existing appliqué. The invented appliqués allow the customer to do more artistic customization without cutting and matching elements, or guessing on their placement on the wall or other surfaces to be decorated. The invented appliqué 10 can be adhered to a painted wall, wallpaper, or preferably to any other smooth surface such as wood, glass, metal, plastic, paper or paperboard, or plaster.

EXAMPLE 1

An invented appliqué having an offset printed four-color ink design layer was applied to a latex painted gypsum board wall as described above, and painted, over with one coat of a standard latex paint, i.e., Sherwin Williams 990 paint. The magenta pigment used for the magenta ink was quinacridone red C.I.E. 122. The magenta pigment did not appear visible through the coat of paint and further, did not become visible or bleed through the coat of paint after one year. This was a surprising and unexpected result.

Although the hereinabove described embodiments of the invention constitute the preferred embodiments, it should be understood that modifications can be made thereto without departing from the scope of the invention as set forth in the appended claims.

What is claimed is:

1. A dry-transfer appliqué comprising an ink design layer and a pressure sensitive adhesive layer, said ink design layer comprising at least three color ink layers, one of said color ink layers being a magenta color ink layer having a bleed-resistant magenta color pigment that will not bleed or show through two coats of standard latex paint, applied over said appliqué, for at least one year following application of said latex paint.

2. A dry-transfer appliqué according to claim 1, wherein said magenta color pigment is non-staining.

3. A dry-transfer appliqué according to claim 1, wherein said magenta color pigment is substantially water insoluble.

4. A dry-transfer appliqué according to claim 1, wherein said magenta color pigment is light-fast.

5. A dry-transfer appliqué according to claim 1, wherein said pressure sensitive adhesive layer has substantially the same shape as said ink design layer.

6. A dry-transfer appliqué according to claim 1, wherein said magenta color pigment has C.I.E. Lab chromaticity coordinates of:

L: 40–80, a: 50–90, and b: −14–50.

7. A dry-transfer appliqué according to claim 1, wherein said magenta color pigment is selected from the group consisting of quinacridone pigments, rhodamine pigments, anthropyridone pigments, and mixtures thereof.

8. A dry-transfer appliqué according to claim 7, wherein said magenta color pigment is a quinacridone red pigment.

9. A dry-transfer appliqué according to claim 8, wherein said magenta color pigment is selected from the group consisting of C.I.E. 122, C.I.E. 122:1, C.I.E. 122:2, and C.I.E. 122:3 quinacridone red pigments, and mixtures thereof.

10. A dry-transfer appliqué according to claim 1, further comprising a structural layer, wherein said structural layer and said pressure sensitive adhesive layer are substantially the same shape as, and in register with, said ink design layer, and said structural layer is disposed in a position selected from the group consisting of:

a) in front of said ink design layer, wherein said ink design layer is printed on said structural layer and said pressure sensitive adhesive layer is disposed adjacent said ink design layer opposite said structural layer, and b) behind said ink design layer, wherein said structural layer is disposed between said ink design layer and said pressure sensitive adhesive layer.

11. A dry-transfer appliqué according to claim 10, wherein said structural layer extends 0.05–5 mm beyond said ink design layer around a perimeter thereof.

12. A dry-transfer appliqué according to claim 1, wherein said ink design layer comprises yellow, cyan, and black color ink layers, said color ink layers being disposed in the order yellow:magenta:cyan:black, said yellow color ink layer being the distant-most color ink layer from said pressure sensitive adhesive layer.

13. A dry-transfer appliqué according to claim 12, wherein at least one of said color ink layers comprises at least one additive selected from the group consisting of photo-initiators, waxes, metal salt driers, anti-oxidants, anti-skinning agents, strong solvents, gelling agents, bodying agents, non-offsetting and rub-resistant agents, siliconized oils, UV cure initiators, and electron beam cure initiators.

14. A dry-transfer appliqué according to claim 12, wherein each of said color ink layers has a thickness of 0.2–7 mils.

15. A dry-transfer appliqué according to claim 10, wherein said structural layer is a substantially clear structural layer and has a thickness of 0.3–8 mils.

16. A dry-transfer appliqué according to claim 1, wherein said pressure sensitive adhesive layer is a non-staining pressure sensitive adhesive layer and has a thickness of 0.2–7 mils.

17. A dry-transfer appliqué according to claim 16, wherein said pressure sensitive adhesive layer is an acrylic pressure sensitive adhesive layer.

18. A dry-transfer appliqué according to claim 16, wherein said pressure sensitive adhesive layer has an initial tack of 5–15 oz/in and a permanent tack of at least 25 oz/in.

19. A dry-transfer appliqué according to claim 1, further comprising a backing layer disposed between said ink design layer and said pressure sensitive adhesive layer.

20. A dry-transfer appliqué according to claim 19, wherein said backing layer is an opaque layer having a continuous binder phase and a pigment phase, said pigment phase dispersed throughout said binder phase.

21. A dry-transfer appliqué according to claim 19, wherein said ink design layer extends 0.05–5 mm beyond said backing layer around a perimeter thereof, said backing layer having substantially the same shape as said ink design layer.

22. A dry-transfer appliqué according to claim 12, wherein said color ink layers of said ink design layer are printed via an offset lithography printing process.

23. A dry-transfer appliqué according to claim 12, wherein said color ink layers of said ink design layer are printed via a process selected from the group consisting of waterless offset printing, direct lithographic printing, intaglio printing, gravure printing, screen printing, ink jet printing, electrographic direct digital printing, and electrocoagulation printing.

24. A dry-transfer appliqué according to claim 1, further comprising an adhesive release liner adhered to said pressure sensitive adhesive layer opposite said ink design layer, said adhesive release liner being effective to prevent the appliqué from sticking to itself or to other objects prior to application to a wall or surface.

25. A dry-transfer appliqué according to claim 15, further comprising a carrier sheet disposed adjacent said clear structural layer opposite said ink design layer.

26. A dry-transfer appliqué according to claim 25, wherein said carrier sheet is a translucent polystyrene sheet.

27. A dry-transfer appliqué according to claim 26, wherein said polystyrene sheet has a thickness of 1–8 mils.

28. A dry-transfer appliqué according to claim 1, said two coats of standard latex paint being applied directly over and in contact with said appliqué.

29. A dry-transfer appliqué according to claim 1, wherein said bleed-resistant magenta color pigment will not bleed or show through one coat of standard latex paint, applied over said appliqué, for at least one year following application of said latex paint.

30. A dry-transfer appliqué comprising a design layer having yellow, magenta, cyan and black ink layers in the order yellow:magenta:cyan:black, each of said ink layers being 0.2–5 mils thick, a 0.2–5 mils thick clear structural layer disposed adjacent said design layer, a 0.2–5 mils thick opaque white backing layer disposed adjacent said clear structural layer opposite said design layer, and a 0.2–7 mils thick tacky PSA layer disposed adjacent said opaque white backing layer opposite said clear structural layer, said magenta ink layer having a magenta pigment comprising quinacridone red C.I.E. 122, said PSA layer having an initial tack of 5–15 oz/in to allow temporary attachment and repositioning of the appliqué, and a permanent tack of at least 25 oz/in following application of said appliqué to a desired surface under pressure from a hard wallcovering seam roller or other applicator having a 0.05–5 mm diameter edge.

31. A dry-transfer appliqué according to claim 30, further comprising a release liner, said yellow, magenta, cyan and black ink layers of said design layer being printed in reverse order on said release liner, at least one of said ink layers having suitable release properties relative to said release liner to permit removal of said release liner after said appliqué has been permanently applied to said desired surface.

32. A dry-transfer appliqué according to claim 1, wherein said magenta color pigment has C.I.E. Lab chromaticity coordinates of:

L: 50–70, a: 60–85, and b: −10–40.

33. A dry-transfer appliqué according to claim 1, wherein said magenta color pigment has C.I.E. Lab chromaticity coordinates of:

L: 55–65, a: 65–80, and b: −5–30.

34. A dry-transfer appliqué according to claim 1, wherein said magenta color pigment has C.I.E. Lab chromaticity coordinates of:

L: 60–64, a: 70–79, and b: −1–20.

35. A dry-transfer appliqué according to claim 1, wherein said magenta color pigment has C.I.E. Lab chromaticity coordinates of:

L: 61–63, a: 73–78, and b: 0–15.

36. A dry-transfer appliqué according to claim 1, wherein said magenta color pigment has C.I.E. Lab chromaticity coordinates of:

L: 61.5–62.5, a: 75–76, and b: 2–10.

\* \* \* \* \*

UNITED STATES PATENT AND TRADEMARK OFFICE
CERTIFICATE OF CORRECTION

PATENT NO. : 6,703,089 B2
APPLICATION NO. : 09/970827
DATED : March 9, 2004
INVENTOR(S) : David A. DeProspero It is certified that error appears in the above-identified patent and that said Letters Patent is hereby corrected as shown below:

<u>Title Page, (75) Inventors:, line 2</u>

After "(US);", please delete "Theresa Lozinski, Cleveland, OH (US)".

Signed and Sealed this

Third Day of June, 2008

JON W. DUDAS
*Director of the United States Patent and Trademark Office*